June 20, 1950 L. M. POTTS 2,512,038

ERROR DETECTING CODE SYSTEM

Filed June 7, 1947 4 Sheets-Sheet 1

INVENTOR
LOUIS M. POTTS, DECEASED
MARTHA W. C. POTTS, EXECUTRIX
BY Emery Robinson
ATTORNEY June 20, 1950 L. M. POTTS 2,512,038

ERROR DETECTING CODE SYSTEM

Filed June 7, 1947 4 Sheets-Sheet 2

INVENTOR
LOUIS M. POTTS, DECEASED
MARTHA W. C. POTTS, EXECUTRIX
BY Emery Robinson
ATTORNEY

ERROR DETECTING CODE SYSTEM

Filed June 7, 1947

4 Sheets-Sheet 3

INVENTOR
LOUIS M. POTTS, DECEASED
MARTHA W. C. POTTS, EXECUTRIX
BY Emery Robinson
ATTORNEY

ERROR DETECTING CODE SYSTEM

Filed June 7, 1947 4 Sheets-Sheet 4

INVENTOR
LOUIS M. POTTS,
DECEASED
MARTHA W. C. POTTS,
EXECUTRIX
BY Emery Robinson
ATTORNEY Patented June 20, 1950

2,512,038

UNITED STATES PATENT OFFICE 2,512,038

ERROR DETECTING CODE SYSTEM

Louis M. Potts, deceased, late of Evanston, Ill., by Martha W. C. Potts, executrix, Evanston, Ill., assignor to Teletype Corporation, Chicago, Ill., a corporation of Delaware Application June 7, 1947, Serial No. 753,266

17 Claims. (Cl. 250—8)

Figure 1:
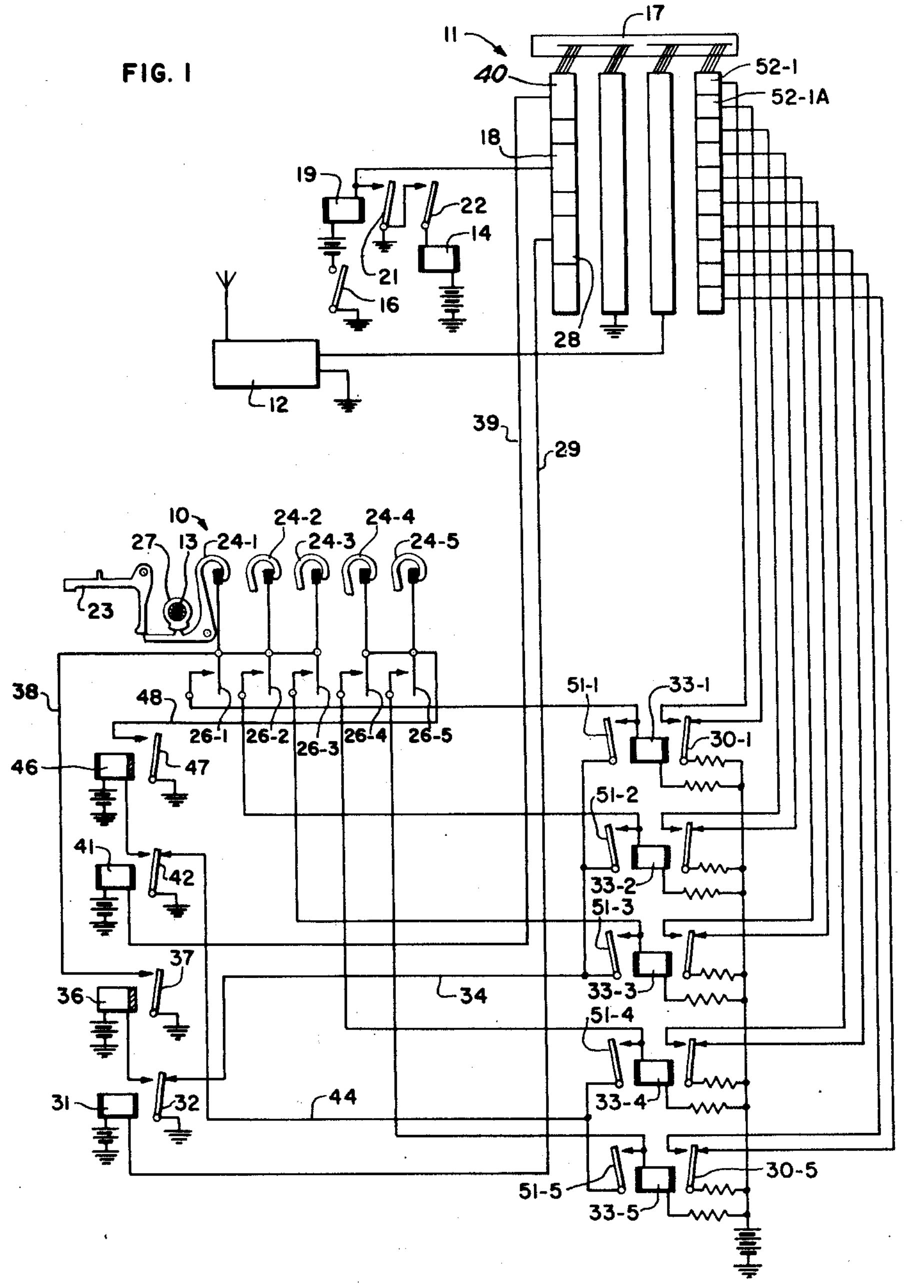

This invention relates to printing telegraph systems and apparatus, and particularly to an error detecting code system which automatically detects errors in signal transmission.

In printing telegraph systems, especially where radio channels are used as a communicating medium, as distinguished from wire channels, atmospheric and other electrical disturbances may cause false operations of printing telegraph apparatus.

Accordingly, an object of the present invention is to provide an error detecting code system wherein an error indication is recorded at a receiving station when message signals are not received as transmitted.

Another object of the invention is to provide in a telegraph system means to transmit two groups of interleaved signals for each character, the individual signals of one group being opposite in nature to the corresponding individual signals of the other group and means to receive said interleaved signals and record normal characters when the individual signals of one group are opposite in nature to the corresponding individual signals of the other group. If the individual received signal elements of one group are not opposite in nature to the corresponding signal elements of the other group, an error indication will be recorded.

A further object of the invention is to provide a single channel error detecting code system which may be readily converted into a two channel multiplex system having no error indicating feature.

Still another object of the invention is to provide a single channel error detecting code system which may be readily converted into a system wherein a single transmitter may transmit identical signals to a plurality of distant recorders.

Other objects, features, and advantages of the invention although not specifically recited above will become apparent as the invention is described in more detail.

In the proposed error detecting code system, each element of a five unit signal code combination is transmitted twice, once in a normal manner and immediately thereafter in an inverted manner. Two groups of interleaved signals are, therefore, transmitted for each character with the individual signals of one group being opposite in nature to corresponding individual signals of the other group. Since it is unlikely that static or other interference will produce opposite effects by deleting and adding signal impulses at substantially the same time, such a system acts as a very reliable error indicator. In such a system, it is almost certain that either the normal or the inverted signal will come through to the receiver and act as an error indicating control medium as will hereinafter appear.

In one embodiment of the invention, signals to be transmitted are acquired from a tape transmitter and stored in a set of five storage relays. The storage relays, in addition to having the usual locking contact tongues, are each provided with an operating contact tongue which is connected to battery and moves between a front and back contact. The front contacts are individually connected with the normal segments of a distributor, while the back contacts are connected to the segments which control the transmission of inverted signals. The normal and inverted transmitting segments of the distributor are interleaved or alternated with respect to each other, so that an inverted signal invariably follows the normal signal to which it is related. It is thus evident that when transmission is taking place, each operating contact tongue of a particular storage relay will either be resting on the normal front contact or the inverted back contact. If a particular operating contact tongue is resting on its front contact, the normal transmitting segment connected therewith causes the transmission of a current impulse when it is traversed by the distributor brush and the immediately following inverted segment will transmit a no current impulse. On the other hand, when a particular contact tongue is resting on its back contact, the normal transmitting segment connected therewith, when traversed by the distributor brush, causes the transmission of a no current impulse and the immediately following inverted segment will transmit a current impulse. A radio system of communication is disclosed in the present invention but it will be understood that the invention is not confined to such use and may find application in wired systems or other means of communication.

The incoming interleaved signals are stored by a set of five pair of primary storage relays operable under the control of a receiving distributor, one member of each pair of said relays representing normal signals and the other member of each pair representing inverted signals. By means of control relays and special segments of the receiving distributor, signals are transferred to a set of five pair of secondary storage relays. Certain operating contact tongues of this latter sets of relays are so arranged that if any given pair of relays, that is, one which receives normal signals and one which receives inverted signals do not respond in an opposite manner, a chain circuit will be broken causing the de-energization of an error indicating relay and the printing of an error indicating character. The printer employed in the present invention is of the type shown in the patent of Kleinschmidt, No. 1,567,599. When undistorted signals are received, a set of five printer code magnets are selectively operated to print normal characters, by means of a selector such as is shown in the afore-mentioned patent.

A modification of the proposed error detecting code system has for its main feature the provision of switching means at the transmitting and receiving ends of a line which may convert a single channel error detecting system into a two channel multiplex system having no error detecting feature. In the two channel system, the signal code combinations of the individual transmitting stations are interleaved with respect to each other, element by element. This modification might be useful when reception is good and interference is at a minimum. Under these operating conditions, the error detecting feature would not be necessary and the manual switch could be moved to its two channel multiplex position to handle extra traffic.

By operating only the switching means at the receiving end of the line, a single transmitter may transmit identical messages to a pair of recorders and thus further flexibility is added to the invention.

Figure 2:
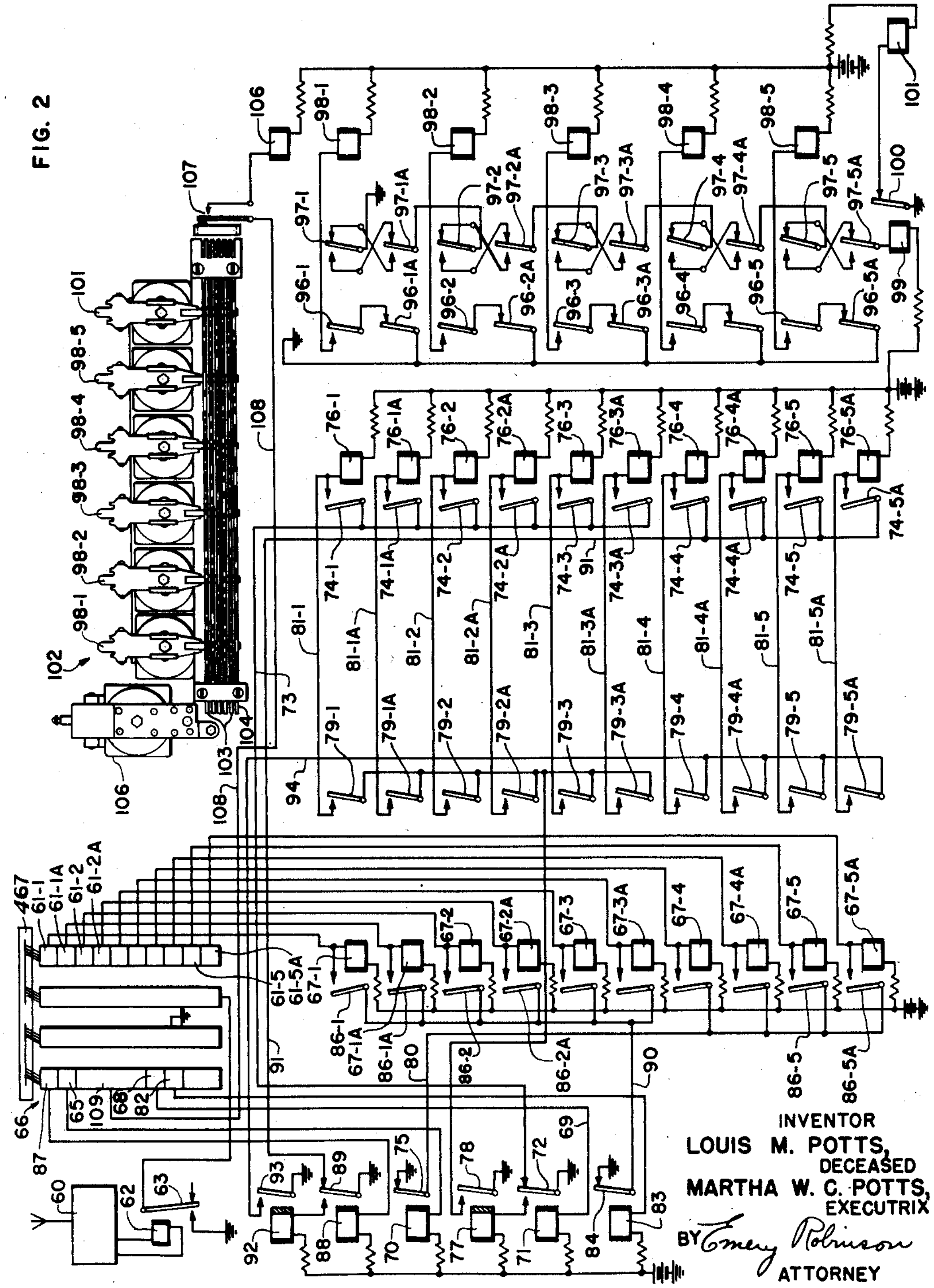
Figure 3:
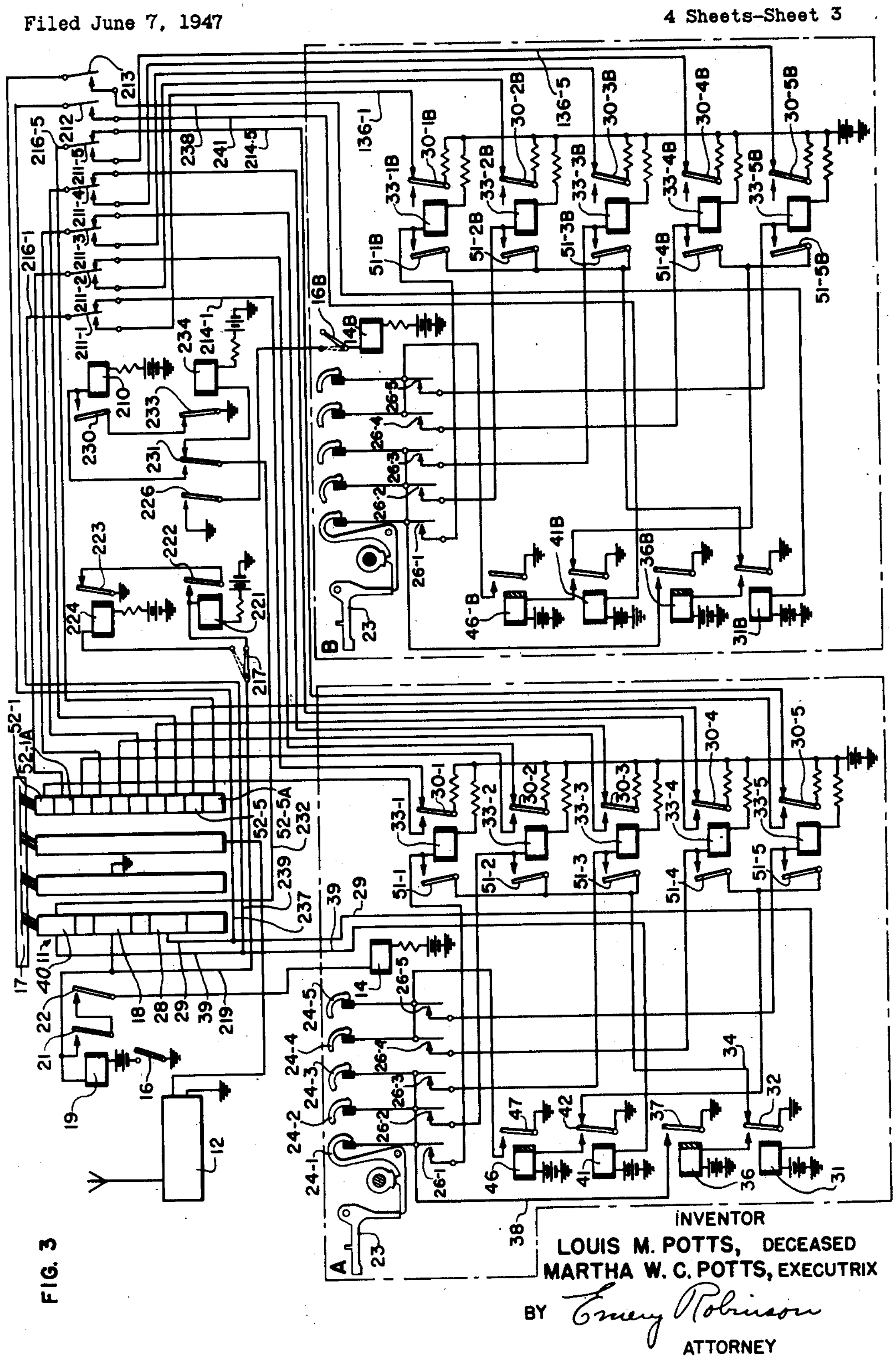
Figure 4:
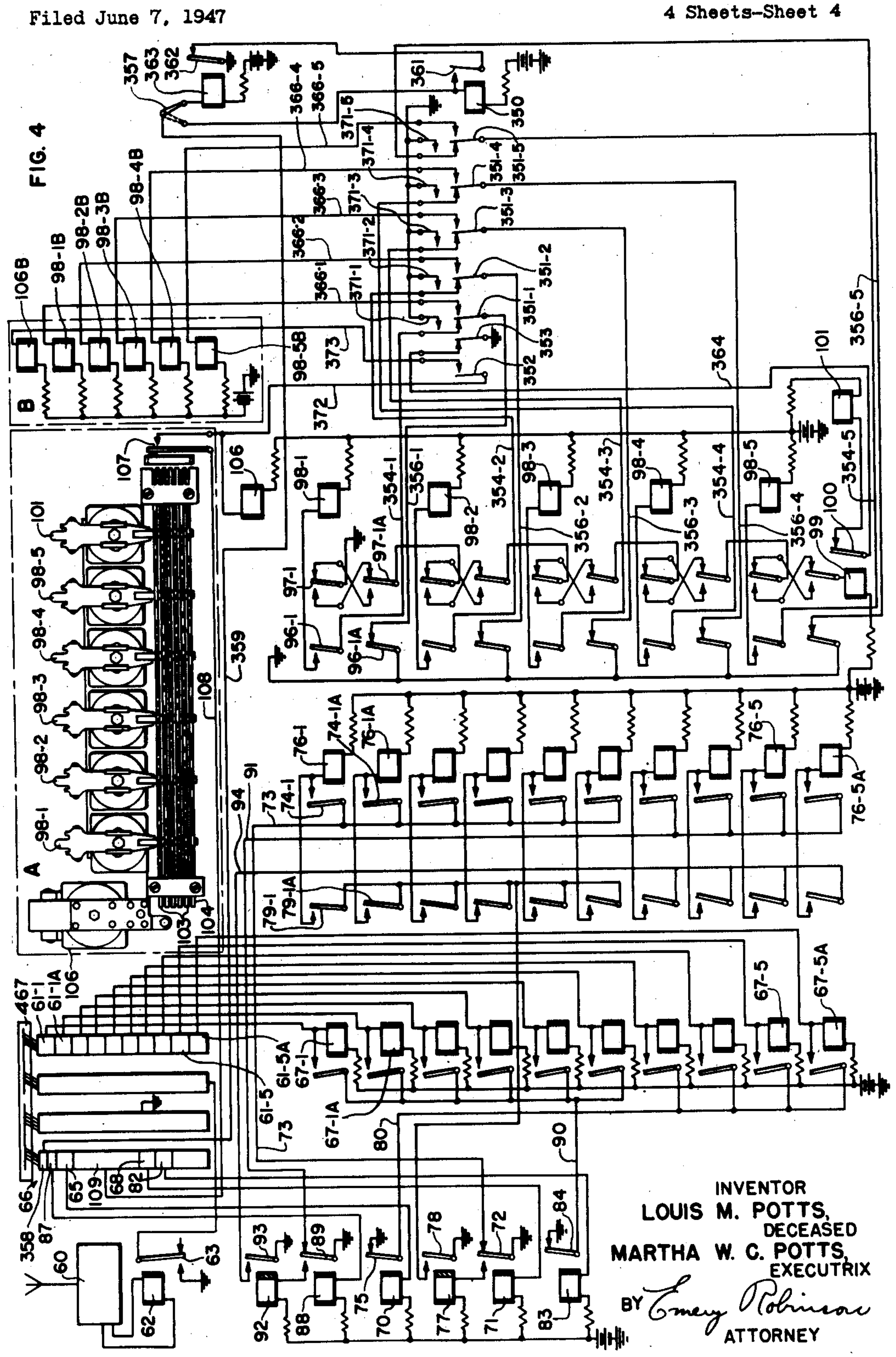

Figs. 1 and 2 are schematic circuit illustrations which illustrate respectively the transmitting and receiving ends of a communication channel involved in the main embodiment of the invention; and Figs. 3 and 4 are schematic circuit illustrations which illustrate respectively the transmitting and receiving ends of a communication channel involved in another embodiment of the invention.

With reference to Figs. 1 and 2, the first embodiment of the invention will now be described. Numeral 10 represents a five unit code tape transmitter which may be of any conventional type with modifications in accordance with the present invention. A continuously rotating distributor is shown at 11 which is associated with a radio transmitter 12 by means of which outgoing signals are modulated.

Transmitter 10 includes the usual transmitting cam sleeve 13 whose rotation is controlled by a clutch start magnet 14. When it is desired to start the transmitter 10, switch 16 is closed and as brush arm 17 of distributor 11 sweeps over segment 18, an obvious circuit is made for relay 19 which locks up through its contact tongue 21. An obvious circuit is also established through contact tongue 22 of relay 19 for energizing clutch start magnet 14 thereby releasing cam sleeve 13 for rotation.

According to the operation of a series of tape sensing levers 23 gooseneck transmitting levers 24—1 to 24—5 are allowed to operate to provide a selection on the transmitting contacts 26—1 to 26—5. At the same time that brush arm 17 is traversing the segment 18, a bail (not shown) withdraws those sensing levers 23 which have been engaging perforations of a tape. The tape is then fed forward to a new position by means not shown and the bail allows the sensing levers to thereafter feel for a new code combination in the tape. At the time the sensing levers 23 are withdrawn, the tape is stepped and the sensing levers 23 are again allowed to feel for a new combination, gooseneck transmitting levers 24—1 to 24—5 ride on the high part of associated transmitting cams 27, maintaining an open condition of all transmitting contacts 26—1 to 26—5. However, by the time brush arm 17 moves past segment 18, transmitting levers 24—1 to 24—5 are free to operate in accordance with the new selection provided by the tape. It is thus seen that the transmitting levers 24—1 to 24—5 maintain their operated positions for the greater portion of a revolution of cam sleeve 13.

When distributor brush arm 17 traverses segment 28 a circuit is established over lead 29 for control relay 31. As control relay 31 attracts its contact tongue 32, a locking circuit is broken for the upper three storage relays 33—1, 33—2 and 33—3 which extended over lead 34. As contact tongue 32 moves to its front contact it causes the energization of a slow-to-operate relay 36, which now attracts its contact tongue 37 and provides a ground circuit extending over lead 38 for transmitting contacts 26—1, 26—2, and 26—3, which just previously have been set according to the new code combination in the tape. If any of the just mentioned transmitting contacts are operated, a circuit will be completed to the associated storage relays 33—1, 33—2, and 33—3 which are now set in accordance with the new code combination provided by the tape. Since relay 36 is slow-to-operate, ground will be extended through contact tongue 37 for a sufficient interval of time to allow contact tongue 32 to fall against its back contact without breaking the circuit to any of the storage relays 33—1, 33—2, and 33—3 which may be energized. It should be noted that when the contact tongue 32 moves away from its back contact as was explained above, the locking circuit for storage relays 33—1, 33—2, and 33—3 is broken and the previous selection stored in these relays is erased.

When distributor brush arm 17 traverses segment 40 a circuit is established over lead 39 for the control relay 41. When control relay 41 is energized its contact tongue 42 moves from its back contact breaking the locking circuit extending over lead 44 for storage relays 33—4, 33—5, erasing the selection previously stored in these particular storage relays. As contact tongue 42 moves to its front contact, it closes a circuit for a slow-to-operate relay 46 which, through the operation of its contact tongue 47, now provides a ground circuit extending over lead 48 for transmitting contacts 26—4 and 26—5 if they are operated at this time. In this manner a new selection will now be established for the storage relays 33—4 and 33—5. It is apparent that relays 41, 46, function exactly like relays 31, 36 to erase the previous selection stored thereby and establish a new selection therein.

In addition to the locking contact tongues 51—1 to 51—5, storge relays 33—1 to 33—5 are provided with operating contact tongues 30—1 to 30—5 which move between front and back contacts. The front contacts are connected to the normal transmitting segments 52—1 to 52—5 of distributor 11 while the back contacts are connected to the inverted transmitting segments 52—1A to 52—5A. It is thus obvious by an inspection of Fig. 1 that a battery circuit may extend through tongues 30—1 to 30—5 and either a front contact or a back contact to the radio transmitter 12 as the distributor brush arm 17 traverses the individual transmitting segments.

It is further apparent that if current flows through transmitting segment 52—1, no current will pass through its companion transmitting segment 52—1A, and in a like manner the remaining four pairs of transmitting segments will be operated. Conversely, if no current is passed through the transmitting segment 52—1, current will flow through the transmitting segment 52—1A and in a like manner the remaining four pairs of transmitting segments will be operated. Thus, each element of a code combination will be transmitted twice by the radio transmitter 12, once in a normal manner, and immediately thereafter in an inverted manner.

Before commencing a description of the receiver shown in Fig. 2, it will be understood that the transmitting distributor at the transmitting station and the receiving distributor at the receiving station may be synchronized in any conventional manner. At the receiving station there is located a radio receiver 60 which demodulates incoming signals and accordingly operates a receiving relay 62 causing its contact tongue 63 to move back and forth in accordance with incoming signals. Such incoming signals by means of receiving segments 61—1 to 61—5 and 61—1A to 61—5A of the receiving distributor 66 are transferred to a set of five pairs of primary storage relays 67—1 to 67—5 and 67—1A to 67—5A.

When distributor brush arm 467 reaches segment 68, a circuit is completed over lead 69 for control relay 71 which now operates and breaks a locking circuit by attracting its tongue 72, extending over lead 73, through the locking tongues 74—1 to 74—3 and 74—1A to 74—3A for associated secondary storage relays 76—1 to 76—3 and 76—1A to 76—3A, erasing the previous selection existing in these relays. When contact tongue 72 of control relay 71 moves against its front contact a circuit is established for the slow-to-operate relay 77 which now attracts its contact tongue 78 and provides a ground circuit for contact tongues 79—1 to 79—3 and 79—1A to 79—3A of associated primary storage reays 67—1 to 67—3 and 67—1A to 67—3A. Contact tongues 79—1 to 79—3 and 79—1A to 79—3A will have been set according to the previous code combination received by the primary storage relays and will accordingly transfer their selection over associated leads 81—1 to 81—3 and 81—1A to 81—3A to secondary storage relays 76—1 to 76—3 and 76—1A to 76—3A. It is apparent that relays 71 and 77 operate in a manner similar to relays 31, 36, and 41, 46 described in Fig. 1. When segment 82 is reached by distributor brush arm 467 an obvious circuit is established for relay 83 which now attracts its contact tongue 84 to break a locking circuit which was established over lead 90 through contact tongues 86—1 to 86—3 and 86—1A to 86—3A for the upper three pair of primary storage relays 67—1 to 67—3 and 67—1A to 67—3A, readying these relays to receive the next incoming signal code combination. It is thus observable, therefore, that during the traversal of segment 82 by brush arm 467, primary storage relays 67—1 to 67—3 and 67—1A to 67—3A are released in preparation for the receipt of a new selective setting through receiving segments 61—1 to 61—3 and 61—1A to 61—3A; this next combination being transferred to the associated secondary storage relays during the traversal of segments 68 by brush arm 467.

When distributor brush arm 467 traverses segment 87 a readily traceable circuit is made for relay 88 which now energizes to move its contact tongue 89 from its back contact to its front contact. This breaks a locking circuit extending over lead 91, through contact tongues 74—4, 74—5, 74—4A and 74—5A for secondary storage relays 76—4, 76—5, 76—4A, and 76—5A, erasing the previous selection existing in these storage relays. When contact tongue 89 of control relay 88 moves against its front contact, it establishes a circuit for a slow-to-operate relay 92 which by attracting its contact tongue 93 now provides a ground circuit extending over 94 for contact tongues 79—4, 79—5, 79—4A, and 79—5A of primary storage relays 67—4, 67—5, and 67—4A and 67—5A which have previously been locked up in accordance with the last signal received thereby. A setting is now transferred over leads 81—4, 81—5, 81—4A and 81—5A to associated secondary storage relays 76—4, 76—5, 76—4A and 76—5A which again lock up through their locking contact tongues as was described in connection with relay 71.

When distributor brush arm 467 traverses segment 65 a circuit is completed for relay 70 which now attracts its contact tongue 75, thereby breaking a locking circuit existing over lead 80 and through contact tongues 86—4, 86—5 and 86—4A and 86—5A of primary storage relays 67—4, 67—5, 67—4A and 67—5A, thereby erasing a previous selection existing in these relays and preparing them for the reception of the next incoming signal.

The secondary storage relays are also provided with a series of contact operating tongues 96—1 to 96—5, 96—1A to 96—5A and 97—1 to 97—5 and 97—1A to 97—5A. Each pair of contact tongues, 96—1, 96—1A for example, when oppositely operated as the signals are received as transmitted, causes a completion of the circuit to an associated code magnet 98—1. The remaining printer code magnets 98—2 to 98—5 are operated in a similar manner. The code magnets 98—1 to 98—5 are used in a receiver such as is disclosed in the patent of Kleinschmidt, No. 1,567,599, issued December 29, 1925. When the signals are being received without errors, contact tongues 97—1 and 97—1A are always oppositely operated and since the remaining contact tongues 97—2 to 97—5 and 97—2A to 97—5A operate in a similar manner, a chain circuit is traceable to an error controlling relay 99. However, if interference or other conditions cause a pair of contact tongues to operate to like positions, the chain circuit will be broken, and relay 99 will release its tongue 100 to complete a circuit for an error indicating magnet 101.

The code magnets 98—1 to 98—5 and error indicating magnet 101 are part of a selector indicated generally as numeral 102 which is similar to a selector shown in the previously mentioned Kleinschmidt patent. The code magnets 98—1 to 98—5 selectively control the setting of individually associated code bars 103 while an added sixth error indicating code bar 104 is operable under the control of error indicating magnet 101. When code bar 104 is operated, it causes the printing of an error indication and blocks printing of all the normal characters. A printer magnet 106 is also provided which is similar to the printer magnet 653 shown in the Kleinschmidt patent. According to the operation of code magnets 98—1 to 98—5 and error magnet 101, code bars 103 and 104 are permissibly allowed to move to the right and close the contact 107 to thereby energize the printer magnet 106 over lead 108 when segment 109 is traversed by the distributor brush arm 467. It is to be understood, however, that code bar 104 moves to the right only upon the reception of an improper signal.

In order to make clear the operation at a receiving station, a summarized description will now be given, it being assumed that the receiving distributor 66 is rotating in synchronism with the distributor 11 at a transmitting station. As distributor brush arm 467 traverses segment 68, a selection stored on contact tongues 79—1 to 79—3 and 79—1A to 79—3A of primary storage relays 67—1 to 67—3 and 67—1A to 67—3A is transferred to second storage relays 76—1 to 76—3 and 76—1A to 76—3A after the selection previously existing in these last-mentioned relays has been erased as described in detail above. When segment 82 is traversed by distributor brush arm 67 the selection existing in primary storage relays 67—1 to 67—3 and 67—1A to 67—3A is erased and these relays are now ready to receive the next signal code combination.

When segment 87 is traversed by brush arm 467 the signals stored on contact tongue 79—4, 79—5, 79—4A and 79—5A of primary storage relays 67—4, 67—5, 67—4A and 67—5A are transferred to secondary storage relays 76—4, 76—5, 76—4A and 76—5A after the previous signal existing in these last-mentioned relays has been erased as previously described. When segment 65 is crossed by distributor brush arm 467 the selection existing in primary storage relays 67—4, 67—5, 67—4A and 67—5A is erased, preparing these relays for the reception of the next signal code combination.

Failure of the secondary storage relays 76—1 to 76—5 and 76—1A to 76—5A to respond oppositely with respect to any individual pair thereof will break the chain circuit existing to error control relay 99 and cause the printing of an error indication character. On the other hand, when reception is normal, as segment 109 is traversed by brush arm 467, a circuit will be completed through contact 107, over lead 108, and the printer magnet 106 will operate to print a normal character. It is to be noted that if an all spacing or idle signal is received without distortion, none of the code magnets 98—1 to 98—5 or error magnet 101 will operate. Therefore, contact 107 will not close and no printing operation will take place. No special idle signals are required as in the seven unit radio code system since the present system always insures that signal reversals will be provided for synchronism purposes.

The second embodiment of the invention, shown in Figs. 3 and 4, will now be described with the understanding that like parts appearing in both embodiments of the invention will be similarly numbered and that the description will not be repeated except where necessary to give a full understanding of the second embodiment of the invention. It will be recalled that the feature of the embodiment of the invention now being considered is that it enables a single channel error indicating system to be converted into a two channel multiplex system without error indication.

There is shown in Fig. 3, two transmitters, an A channel transmitter and a B channel transmitter. When a control relay 210 is in its de-energized condition its contact swingers 211—1 to 211—5 are resting on their back contacts and contact tongues 212 and 213 are unattracted so that transmission may take place over the A channel exactly as was described in the first embodiment of the invention; that is, each signal element is transmitted twice, once in a normal manner and immediately thereafter in an inverted manner for error detection purposes. However, it will be noted that now the back contacts associated with contact tongues 30—1 to 30—5 of storage relays 33—1 to 33—5 instead of being connected directly to segments 52—1A to 52—5A are now connected through swinger contacts 211—1 to 211—5, when control relay 210 is de-energized, by the connection of leads 214—1 to 214—5 with individually associated leads 216—1 to 216—5. When the A channel is transmitting under these conditions, the B channel transmitter remains idle.

When it is desired to convert to a two channel multiplex system without error detecting, switch 217 is moved to its lower position and upon the next rotation of brush arm 17, when segment 18 is reached, a circuit extends over lead 219 through switch 217 and through the winding of relay 221. Relay 221 pulls up its locking contact tongue 222 which is now in series with contact tongue 223 of relay 224. Closure of contact tongue 226 provides an obvious circuit for start magnet 14—B assuming that switch 16—B has been previously closed. Now when the distributor brush arm 17 traversed segment 18, as just explained, relays 19 and 221 are simultaneously pulsed so that start magnets 14 and 14—B are energized at the same time, thus providing synchronism between transmitters A and B.

At this time contact tongue 231 has also been drawn up by relay 221 so that when brush arm 17 reaches segment 40, an impulse is provided over lead 232 through contact tongue 231, and through the winding of control relay 210. Control relay 210 now locks up through its contact tongue 230 which is in series with contact tongue 233 of relay 234. As a result, the circuit paths previously extending from the back contacts of tongues 30—1 to 30—5 of relays 33—1 to 33—5 to segments 52—1A to 52—5A of distributor 11 are now broken. New circuit paths are now made which extend from the back contacts of tongues 30—1B to 30—5B of relays 33—1B to 33—5B over associated leads 136—1 to 136—5, through swinger tongues 211—1 to 211—5 and over leads 216—1 to 216—5 to segments 52—1A to 52—5A of distributor 11.

A pulsing circuit is now made for relay 31—B which now operates simultaneously with relay 31 as follows: from lead 29 over the conductor 237, through swinger tongue 213 (now closed), and over the lead 238 to the winding of relay 31—B. In a similar manner relay 41—B may now receive pulses from the distributor simultaneously with relay 41 over the following circuit: from lead 39, over conductor 239, through swinger tongue 212 (now closed), over conductor 241, and through the winding of relay 41—B. Normal transmission now proceeds over the A and B channels with the signals of the two channels interleaved. It should be noted that the signals transmitted on channel B are inverted since when contact tongues 30—1B to 30—5B fall away in response to the reecipt of spacing impulses by their associated relays 33—1B to 33—5B, battery is supplied to segments 52—1A to 52—5A of distributor 11. This inversion helps to maintain synchronism between transmitting and receiving stations when idle signals are transmitted. The details of this method of phasing are not described herein but are well known in the art.

The inverted signals are returned to normal by the B channel receiver as will appear later in the description.

When it is desired to return to a single channel system with inverted signals for error detecting purposes, switch 217 is moved to its upward position and on the next rotation of brush arm 17 a circuit is established extending from segment 18 over lead 219 and through switch 217 to relay 224. This causes contact tongue 223 of relay 224 to be drawn up and thus breaks the locking circuit for relay 221 causing the contact tongues of the latter relay to fall away. When segment 40 is reached by brush arm 17 the circuit extends over lead 232, through contact 231 (now against its back contact), and through the winding of relay 234 which now energizes and pulls up the contact tongue 233. This breaks the locking circuit previously extending through contact tongues 233 and 230 for relay 210 which now becomes de-energized and its swingers 211—1 to 211—5 and 212, 213, move back to their error detecting position. It will be noted that the circuit for start magnet 14—B is broken as contact tongue 226 falls away upon de-energization of relay 221 and therefore transmitter B comes to rest while transmitter A may now sense signals with the error detecting feature.

At the receiving terminal shown in Fig. 4, there is provided in addition to an A channel printer, which operates exactly like the printer shown in Fig. 2 when the single channel error detecting code is used, a B channel printer which is used when the system is converted to a two channel multiplex. The B channel printer is provided with code magnets 98—1B to 98—5B and a printing magnet 106—B. When the error indicating system is used the B channel printer is idle and only the A channel printer is operated. With control relay 350 de-energized, contact tongues 351—1 to 351—5, and tongues 352 and 353 are in their unattracted positions and the circuit operates exactly like the circuit shown in Fig. 2. However, it will be noted that contact tongues 96—1 to 96—5 of relays 76—1 to 76—5 are now associated with their companion contact tongues 96—1A to 96—5A of relays 76—1 to 76—5 as follows: from leads 354—1 to 354—5, through swinger contacts 351—1 to 351—5 of relay 350 to leads 356—1 to 356—5.

When it is desired to place the receiving end of the line in condition for two channel multiplex reception without error detection, switch 357 is moved to its leftward position. When segment 358 of distributor 66 is traversed by brush arm 467 a circuit is made for relay 350 which extends over lead 359 and through switch 357. Relay 350, therefore, operates and pulls up its locking tongue 361 which is in series with tongue 362 of relay 363. All swingers 351—1 to 351—5 and 352, will now be pulled against their back contacts. Swinger 353 moves off its contact to open the circuit for error code magnet 101 which extends over lead 364 since error detection is not used in the two channel multiplex system. With swinger tongues 351—1 to 351—5 of relay 350 against their front contacts the previously described circuits extending therethrough are broken and leads 356—1 to 356—5 associated with contact tongues 96—1A to 96—5A of relays 76—1A to 76—5A are now connected through swinger tongues 351—1 to 351—5 to leads 366—1 to 366—5 which individually extend to related code magnets 98—1B to 98—5B. Since relays 76—1A to 76—5A operate in an inverted manner to receive incoming signals, that is, their contact tongues fall away in response to spacing conditions, the signals for code magnets 98—1B are now returned to normal. This is due to the fact that when tongues 96—1A to 96—5A move away from relays 76—1A to 76—5A in response to spacing or no current conditions, circuits indicative of marking conditions are completed to individually selected code magnets 98—1B to 98—5B. Ground for contact tongues 96—1 to 96—5 of relays 76—1 to 76—5 is now provided over leads 354—1 to 354—5 to contacts 371—1 to 371—5 since swinger tongues 351—1 to 351—5, when moved off their back contacts, allow these just described circuits to be established.

When swinger 352 of relay 350 closes its contact, printer magnet 106—B will operate in a manner similar to printer magnet 106 due to the circuit provided over lead 372 and through tongue 352 to lead 373. Thus with the control relay 350 energized, signals received by distributor 66 are alternately allocated to the A channel and B channel printers, which function in a manner disclosed in the previously mentioned patent to Kleinschmidt.

When the receiving station is to be returned to a single channel error indicating system, manual switch 357 is moved to the right and upon the next rotation of brush arm 467 of distributor 66 an impulse is provided from segment 358 which extends over lead 359 and through switch 357 to relay 363. Relay 363 is, therefore, energized attracting its contact tongue 362 and breaking the locking circuit previously existing for relay 350. When this occurs, contact swingers 351—1 to 351—5, and 352, 353, are allowed to move to their leftward positions re-establishing the single channel circuit for error detection purposes and again placing the B channel printer in an idle condition.

It should be observed that in connection with Figs. 3 and 4, if switch 357 (Fig. 4) is operated to its rightward position and switch 217 (Fig. 3) is allowed to remain in its upward position, both recorders A and B may print identical messages provided by the A transmitter without the error indication feature. Thus, by such an arrangement the flexibility of the system is increased.

Various changes and modifications may be made in the invention without departing from the spirit and scope thereof except as defined in the appended claims.

What is claimed is:

1. In an error indicating telegraph system having transmitting and receiving stations, means at said transmitting station for sending each element of a signal code combination once in a normal manner and once in an inverted manner, receiving means at said receiving station for receiving said normal and inverted signals, a series of pairs of storage devices operable by said receiving means, one of the individual storage devices of each of said pairs of storage devices being responsive to normal signals and the other to inverted signals, recording means at said receiving station responsive to the opposite operation of the individual storage devices of each pair of said storage devices for recording normal characters, and an error indicating means forming a part of said recording means to record an error indicating character upon the failure of the individual storage devices of any pair to be oppositely operated with respect to each other.

2. In an error indicating telegraph system having transmitting and receiving stations, means at said transmitting station including a signal transmitter distributor for sending each element of a signal code combination once in a normal manner and once in an inverted manner, receiving means at said receiving station including a signal receiver distributor for receiving said normal and inverted signals, a series of pairs of storage devices operable by said receiving means, one of the individual storage devices of each of said pairs of storage devices being responsive to normal signals and the other to inverted signals, recording means at said receiving station responsive to the opposite operation of the individual storage devices of each pair for recording normal characters, and an error indicating means forming a part of said recording means to record an error indicating character upon the failure of the individual storage devices of any pair to be oppositely operated with respect to each other.

3. In an error indicating telegraph system having transmitting and receiving stations, means at said transmitting station for transmitting each element of a signal code combination once in a normal manner and once in an inverted manner, receiving means at said receiving station for receiving said normal and inverted signals, a first series of pairs of storage devices operable by said receiving means, a second series of pairs of storage devices, means for transferring signal code combinations from said first series of pairs of storage devices to said second series of pairs of storage devices, recording means at said receiving station responsive to the opposite operation of the individual storage devices of each pair of said second series of storage devices for recording normal characters, and an error indicating means forming a part of said recording means for recording an error indicating character upon the failure of the individual storage devices of any pair of said second series of storage devices to be oppositely operated with respect to each other.

4. In an error indicating telegraph system, means for transmitting each element of a signal code combination once in a normal manner and once in an inverted manner, receiving means for receiving said normal and inverted signals, and means controlled by said receiving means for recording normal characters in response to said normal and inverted signals being received by said receiving means as transmitted by said transmitting means and including means for recording an error indicating character in response to for any given element of a signal code combination a normal and an inverted signal not being received by said receiving means.

5. In an error indicating telegraph system having transmitting and receiving stations, a transmitter distributor at said transmitting station, signal generating means, a series of storage devices for storing signals provided by said generating means, means oppositely operated in response to the operation of the individual storage devices of said series of storage devices and associated with said transmitter distributor to enable said transmitter distributor to transmit each element of a signal code combination once in a normal manner and once in an inverted manner, receiving means at said receiving stations for receiving said normal and inverted signals, recording means at said receiving station for recording normal characters in response to each signal being received at said receiving station as transmitted by said transmitting station, and means forming a part of said recording means for recording an error indication in response to in a given element of a signal code combination a normal and an inverted signal not being received by said receiving means.

6. In a telegraph system, a transmitting distributor for sending first and second groups of interleaved signals, a first transmitter connectible to said distributor for providing two groups of interleaved signals for transmission by said distributor, each group being of an opposite nature than the other, a receiver distributor for receiving said first and second groups of interleaved signals, a first recorder connectible with said receiver distributor for recording normal characters in response to signals being received as transmitted, an error indicating means forming a part of said recorder operable in response to for any given element of a signal code combination opposite signals not being received, a second transmitter connectible to said transmitter distributor, a second recorder connectible to said receiver distributor, switching means for connecting said second transmitter to said transmitter distributor and for thereby enabling said first and second transmitter to each transmit only a single group of interleaved signals, and switching means for connecting said second recorder to said receiver distributor to enable each of said recorders to receive a single group of the interleaved signals.

7. In a telegraph system, a transmitting distributor for sending first and second groups of interleaved signals, a first transmitter connectible to said distributor for providing two groups of interleaved signals for transmission by said distributor, each group being of an opposite nature than the other, a receiver distributor for receiving said first and second groups of interleaved signals, a first recorder connectible with said receiver distributor for recording normal characters in response to signals being received as transmitted, an error indicating means forming a part of said recorder operable in response to for any given element of a signal code combination opposite signals not being received, a second transmitter connectible to said transmitter distributor, a second recorder connectible to said receiver distributor, switching means for connecting said second transmitter to said transmitter distributor and for thereby enabling said first and second transmitters to each transmit only a single group of interleaved signals, and switching means for connecting said second recorder to said receiver distributor to enable each of said recorders to receive a group of the interleaved signals, said error indicating means being disabled when both of said recorders are connected to said receiver distributor by said last-mentioned switching means.

8. In a telegraph system, a transmitter distributor for transmitting a first and second group of interleaved signals, a transmitter connected to said distributor for providing two groups of interleaved signals for transmission by said distributor, each group being of an opposite nature than the other group, a receiver distributor for receiving said first and second groups of interleaved signals, a recorder controlled by said receiver distributor for recording normal characters in response to signals being received as transmitted, and an error indicating means forming a part of said recorder for recording an error indication in response to for any given element of a signal code combination signals of opposite nature not being received by said receiver distributor.

9. In a telegraph system, a transmitter distributor including alternately arranged segments for transmitting a first and second group of interleaved signals, a transmitter having a series of signal emitting means connectible with said segments for providing two groups of interleaved signals for transmission by said distributor, each group being of an opposite nature than the other group, a receiver distributor for receiving said first and second groups of interleaved signals, a recorder controlled by said receiver distributor for recording normal characters in response to signals being received as transmitted by said transmitter, and an error indicating means forming a part of said recorder for recording an error indication in response to for any given element of a signal code combination signals of opposite nature not being received by said receiver distributor.

10. In a telegraph system, a transmitter distributor including alternately arranged segments for transmitting a first and second group of interleaved signals, a transmitter having a series of signal emitting means connectible with said segments for providing two groups of interleaved signals for transmission by said distributor, each group being of an opposite nature than the other group, a receiver distributor including alternately arranged segments for receiving said first and second groups of interleaved signals, a recorder controlled by said receiver distributor for recording normal characters in response to signals being received as transmitted by said transmitter, and an error indicating means forming a part of said recorder for recording an error indication in response to for any given element of a signal code combination signals of opposite nature not being received by said receiver distributor.

11. In a telegraph system, a radio transmitting means, a transmitter distributor for operating said transmitting means to transmit a first and second group of interleaved signals, a transmitter associated with said distributor for providing for each message character two groups of interleaved signals for transmission by said distributor, each group being of an opposite nature than the other group, a radio receiver for receiving said interleaved signals, a receiver distributor controlled by said radio receiver, a recorder operable in response to the signals received by said receiver distributor for recording normal characters in response to signals being received as transmitted by said transmitter, and an error indicating means forming a part of said recorder for recording an error indication in response to for any given element of a code combination signals of an opposite nature not being received by said receiver distributor.

12. In a telegraph system, a radio transmitting means, a transmitter distributor having alternately arranged segments for operating said transmitting means to transmit a first and second group of interleaved signals, a transmitter connected to said distributor for providing for each message character two groups of interleaved signals for transmission by said distributor, each group being of an opposite nature than the other group, a radio receiver for receiving said interleaved signals, a receiver distributor controlled by said radio receiver, a recorder operable in response to the signals received by said receiver distributor for recording normal characters in response to signals being received as transmitted by said transmitter, and an error indicating means forming a part of said recorder for recording an error indication in response to for any given element of a code combination signals of opposite nature not being received by said receiver distributor.

13. In a telegraph system, a transmitter distributor for transmitting a first and second group of interleaved signals, a transmitter connected to said distributor for providing two groups of interleaved signals for transmission by said distributor, each group being of an opposite nature than the other group, a receiver distributor including alternately arranged segments for receiving said first and second groups of interleaved signals, a recorder controlled by said receiver distributor for recording normal characters in response to signals being received as transmitted by said transmitter, and an error indicating means forming a part of said recorder for recording an error indication in response to for any given element of a signal code combination signals of opposite nature not being received by said receiver distributor.

14. In a telegraph system including a transmitter distributor for transmitting a first and second group of interleaved signals, a transmitter connected to said distributor for providing two groups of interleaved signals for transmission by said distributor, said second group of signals being inverted with respect to said first group of normal signals, a receiving distributor for receiving said groups of interleaved signals, a first recorder controlled by said receiving distributor and operable in accordance with the reception of said first group of signals, means controlled by said receiving distributor for reinverting said second group of received signals to return said signals to normal condition, and a second recorder operable in accordance with said reinverted signals to record intelligence characters identical with corresponding characters recorded by said first recorder.

15. In a telegraph system, a transmitter distributor for sending a first and second group of interleaved signals, a transmitter connected to said distributor for providing two groups of interleaved signals for transmission by said distributor, one group being of an opposite nature than the other group, a receiver distributor for receiving said first and second groups of interleaved signals, a first recorder controlled by said receiver distributor for recording normal characters in response to signals being received as transmitted, an error indicating means forming a part of said recorder and operable in response to for any given element of a signal code combination opposite signals not being received, a second recorder connectible with said receiver distributor, and switching means for connecting said second recorder to said receiver distributor to enable each of said recorders to record identical characters, said error indicating means being disabled upon the operation of said switching means.

16. In an error indicating telegraph system having transmitting and receiving stations, means at said transmitting station for sending each element of a signal code combination once in a normal manner and once in an inverted manner, receiving means at said receiving station for receiving said normal and inverted signals, a series of pairs of relays operable by said receiving means, one of the individual relays of each of said pairs of relays being responsive to normal signals and the other to inverted signals, recording means at said receiving station responsive to the opposite operation of the individual relays of each pair for recording normal characters, and an eror indicating means forming a part of said recording means to record an error indicating character upon the failure of the individual relays of any pair to be oppositely operated with respect to each other.

17. In an error indicating telegraph system having transmitting and receiving stations, means at said transmitting station including a transmitter distributor for sending each element of a signal code combination once in a normal manner and once in an inverted manner, receiving means at said receiving station including a receiver distributor for receiving said normal and inverted signals, a series of pairs of relays operable by said receiving means, one of the individual relays of each of said pairs of relays being responsive to normal signals and the other to inverted signals, recording means at said receiving station responsive to the opposite operation of the individual relays of each pair for recording normal characters, and an error indicating means forming a part of said recording means to record an error indicating character upon the failure of the individual relays of any pair to be oppositely operated with respect to each other.

MARTHA W. C. POTTS,
*Executrix, Under the Last Will and Testament of Louis M. Potts, Deceased.*

REFERENCES CITED

The following references are of record in the file of this patent:

UNITED STATES PATENTS

| Number | Name | Date |
|---|---|---|
| 1,997,683 | Hennig | Apr. 16, 1935 |
| 2,050,265 | Bown | Aug. 11, 1936 |
| 2,052,677 | Thompson et al. | Sept. 1, 1936 |
| 2,183,147 | Moore et al. | Dec. 12, 1939 |
| 2,206,665 | Doty | July 2, 1940 |
| 2,399,734 | Hailes et al. | May 7, 1946 |
| 2,453,659 | Bellescize | Nov. 9, 1948 |

Disclaimer 2,512,038.—*Louis M. Potts*, deceased, late of Evanston, Ill., by *Martha W. C. Potts*, *executrix.* ERROR DETECTING CODE SYSTEM. Patent dated June 20, 1950. Disclaimer filed Aug. 17, 1950, by the assignee, *Teletype Corporation.*

Hereby enters this disclaimer to claim 4 of said patent.

[*Official Gazette September 19, 1950.*]